June 23, 1936. A. P. ARMINGTON 2,045,510
LOCOMOTIVE
Filed Dec. 13, 1935  2 Sheets-Sheet 2

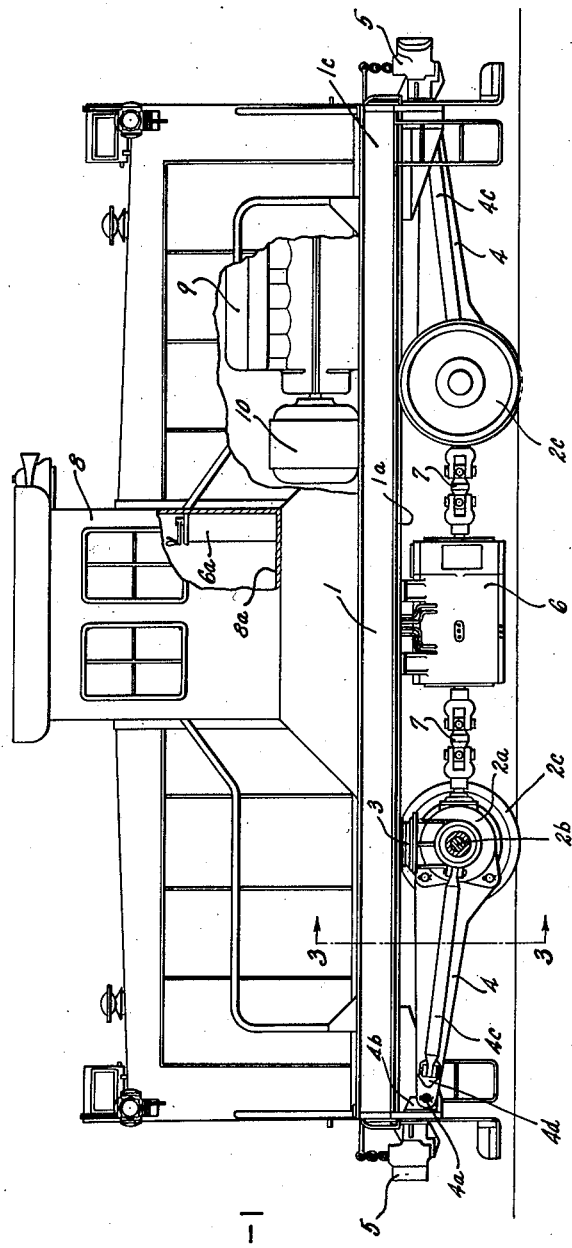

INVENTOR
ARTHUR P. ARMINGTON
BY
*Brockett, Hyde, Higley + Meyer*
ATTORNEYS

Patented June 23, 1936

2,045,510

UNITED STATES PATENT OFFICE 2,045,510

LOCOMOTIVE

Arthur P. Armington, Willoughby, Ohio, assignor to The Euclid Road Machinery Company, Euclid, Ohio, a corporation of Ohio Application December 13, 1935, Serial No. 54,219

3 Claims. (Cl. 105—171)

This invention relates to wheeled vehicles and is particularly adapted for application to rail vehicles and still more particularly to locomotives of the gas-electric type.

Objects of the invention are to provide novel and superior connections between frame and axle, between frame, axles and driving motor, and generally improved disposition of the principal parts and interconnections therefor.

Figure 3:
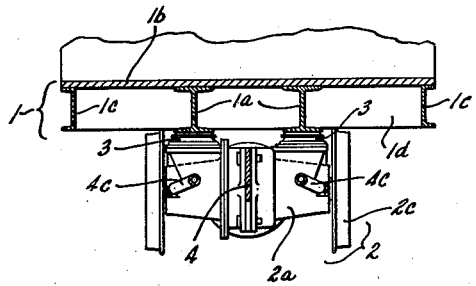
Figure 4:
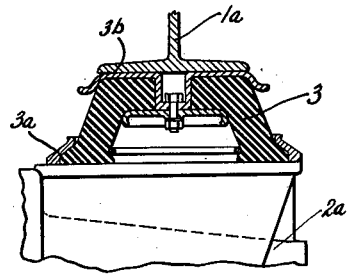
Figure 5:
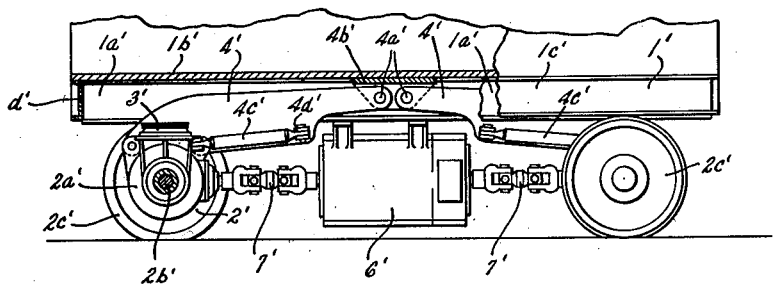
Figure 6:
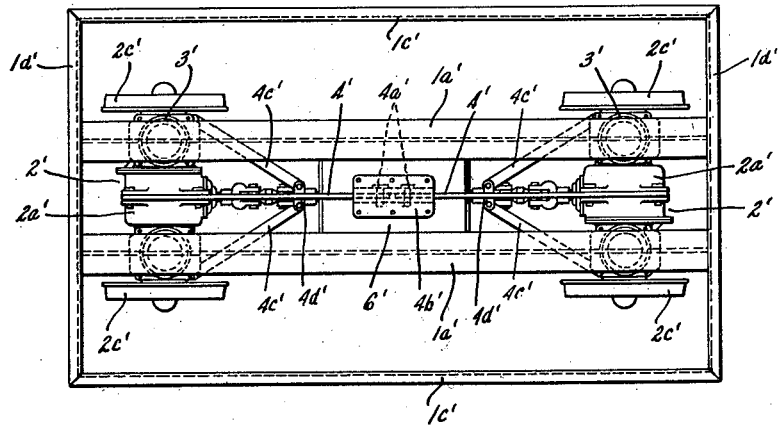

The exact nature of the invention together with further objects and advantages thereof will be apparent from the following description taken in connection with the accompanying drawings, in which Fig. 1 is a side elevation of a gas-electric locomotive embodying the invention, parts being broken away to show details; Fig. 2 is generally a plan view of the running gear of the same, with end parts of the frame appearing, and the location of removed longitudinal frame members indicated in broken lines; Fig. 3 is a sectional elevation as in the plane of lines 3—3, Figs. 1 and 2; Fig. 4 is an enlarged detail in typical sectional elevation, illustrating the type of frame mounting units employed; and Figs. 5 and 6 are views corresponding with Figs. 1 and 2 but illustrating a slightly modified arrangement of parts.

With reference now to the drawings, I represents generally the frame of the vehicle, comprising a pair of laterally spaced longitudinally extending I-beams 1a, a heavy platform 1b overlying the I-beams 1a, a pair of channels 1c at the side edges of the platform, and end members 1d connected with the described longitudinal members.

Axle means are provided for support of the frame and here shown as a pair of longitudinally spaced axles generally indicated at 2, intermediate the ends of the frame so that the latter substantially overhangs the axles. A driving type of axle means is here illustrated, which may be such as more fully illustrated and described in application Serial No. 54,220 filed of even date herewith jointly by Walter F. Double and me. Such type of axle means includes a part which does not rotate with the wheels, as a housing 2a in which a live axle 2b bears and carries the wheels 2c.

For support of the frame upon the axles 2, non-metallic resilient elements 3 of rubber or the like are employed, disposed laterally spaced over each axle between the latter and the frame members 1a thereabove, and mounted as illustrated particularly in Fig. 4. Such type of non-metallic connection is illustrated and described in detail in my copending application Serial No. 13,807, filed March 30, 1935.

It is sufficient here to state that the resilient element 3 is preferably of the bell-shaped form indicated in Fig. 4, disposed with its mouth end bearing upon a pad part of the axle housing 2a and there positioned by a confining ring 3a secured to such pad, the upper end of the element being perforate, confined inside and out by castings 3b rigidly secured to the corresponding element 1a of the frame 1; the securement of the resilient element mounting means being by bolts not appearing in the drawings.

The employment of such resilient mounting means for the frame not only yieldably supports the weight of the latter but also yieldingly resists relative motion between axle and frame in horizontal directions.

Additional means are provided for each axle, for fixing it longitudinally of the frame. Such means includes an axle locating arm 4 which may be disposed in the central longitudinal plane of the vehicle and which may be of heavy steel plate as indicated. The arm is rigidly secured at one end to the housing 2a of its axle in such manner that relative motion between the arm and housing about the wheel axis is impossible. The arm extends from the axle housing to a connection with the frame longitudinally removed from the corresponding axle. The connection with the frame is one of pivotal type permitting the arm free vertical motion about the connection. Obviously such arrangement permits such lateral motion of the axle as is permitted by the elements 3, which latter yieldably maintain the axle in its normal central position. As shown in Figs. 1 and 2, such connection is adjacent the near frame end and accomplished by a pin 4a and bracket 4b mounted on the end frame member 1d immediately adjacent the usual draft coupling 5 there provided. It will be apparent that the arms 4 relieve the resilient elements 3 of stresses longitudinal of the vehicle and transmit tractive forces from their axles substantially directly to the draft couplings 5 by way of the frame 1. Further, it is to be observed that where the axle is a driving axle as shown, the arm 4 also serves to take the torque reaction of the driving forces.

To maintain alignment of each axle with respect to the frame 1 and to substantially relieve its arm 4 of lateral stresses, a pair of braces 4c is provided, each leading from a bracket 4d on the member 4 adjacent its connection with the frame 1, to a connection with the axle housing 2a adjacent an end of the latter.

For motive power an electric motor 6 is mounted beneath the frame 1 between the axles 2 as by suspension from the longitudinal frame members 1a, and at each end of the motor 6 a driving connection 7 including the universal joints indicated, is provided for the near axle 2.

For the operator of the locomotive, a cab 8 is mounted on the frame 1 centrally thereof with an elevated platform 8a and enclosing a controller 6a for the motor 6.

Where the locomotive is of gas-electric type as illustrated, an engine-generator set is mounted upon the frame, both fore-and-aft of the cab 8. Each such set includes an internal combustion engine 9 and an electric generator 10 directly connected thereto. The generators 10 are connected to the controller 6a of the motor 6 in such manner that the motor may receive power from either or both generators 10. The throttles of the two engines 9 are provided with control means convenient to the operator within the cab 8 and of such form that both engines may be controlled similarly and simultaneously as by a common control handle. Thus the motor 6 may be direct connected to both generators 10 by the controller 6a when the engines 9 are idling, and locomotion of the vehicle controlled primarily by the speed of the engines.

It is to be noted that each engine-generator set is mounted on the frame substantially over one of the axles so that the frame is not subject to excessive bending stresses and is substantially free to transmit draft stresses between the couplers 5.

With reference now to Figs. 5 and 6, a modification is illustrated which is adapted for extremely short locomotives such as where the motive power is to be supplied from a trolley. Otherwise and with the exception of the axle locating arms, the general arrangement of parts is substantially as before. The frame 1' being short, is mounted upon the axle means 2' by non-metallic resilient elements 3' as before and the axles are driven by a motor 6' as before. The locating arms 4' for the axles, however, are turned inwardly toward each other and connected with the frame 1' above the motor 6' and adjacent each other, as by pins 4a' carried in a bracket 4b', these arms 4' being rigidly connected to the housings 2a' of their axles as before. Diagonal braces 4c' are also provided each connected with its end of the axle housing 2a', and to a bracket 4d' on its arm 4' as adjacent as possible to the pin 4a'.

What I claim is:

1. In a rail vehicle having a frame and driving axle means, means mounting said frame upon said axle means and including torque arm means locating said axle means longitudinally of said frame while permitting lateral motion of said axle means from a normal central position, said mounting means also including a resilient element arranged for flexure in one direction for vertical springing of said frame and for simultaneous flexure in a lateral direction to yieldably maintain said axle means in said central position.

2. In a rail vehicle having a frame and driving axle means, means interconnecting said frame and said axle means and including a torque arm pivotally anchored to said frame and connected to said axle means for locating said axle means longitudinally of said frame and anchoring said axle means against rotation, while permitting lateral motion of said axle means from a normal central position, and means mounting said frame upon said axle means and including a resilient element arranged for flexure in one direction for vertical springing of said frame and for simultaneous flexure in a lateral direction to yieldably maintain said axle means in said central position, and permitting such motion of said axle means longitudinal of said frame as required by motion of said torque arm.

3. In a rail vehicle having a rigid frame and axle means, having wheels at its ends and a housing between said wheels, said frame having a pair of longitudinal members disposed over said axle means, said frame members and said axle housing having vertically opposed horizontal faces between said wheels, a pair of resilient elements, each mounted between a pair of said faces to resiliently support the corresponding frame members and flexible laterally to yieldably maintain said axle means in a normal central position beneath said frame, and means locating said axle means longitudinally of said frame while permitting lateral motion of said axle means yieldably controlled by said resilient elements.

ARTHUR P. ARMINGTON.